United States Patent
Han et al.

(10) Patent No.: US 11,421,296 B2
(45) Date of Patent: Aug. 23, 2022

(54) STEEL SHEET WITH EXCELLENT BAKE HARDENING PROPERTIES AND PLATING ADHESION AND MANUFACTURING METHOD THEREFOR

(71) Applicant: POSCO, Pohang-si (KR)

(72) Inventors: Sang-Ho Han, Gwangyang-si (KR); Je-Woong Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 154 days.

(21) Appl. No.: 16/955,383

(22) PCT Filed: Nov. 30, 2018

(86) PCT No.: PCT/KR2018/015027
§ 371 (c)(1),
(2) Date: Jun. 18, 2020

(87) PCT Pub. No.: WO2019/124808
PCT Pub. Date: Jun. 27, 2019

(65) Prior Publication Data
US 2021/0071277 A1    Mar. 11, 2021

(30) Foreign Application Priority Data

Dec. 24, 2017 (KR) .................. 10-2017-0178942

(51) Int. Cl.
| | | |
|---|---|---|
| *C21D 9/46* | (2006.01) | |
| *B32B 15/01* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/06* | (2006.01) | |
| *C22C 38/22* | (2006.01) | |
| *C22C 38/32* | (2006.01) | |
| *C22C 38/38* | (2006.01) | |
| *C22C 38/60* | (2006.01) | |
| *C23C 2/02* | (2006.01) | |
| *C23C 2/06* | (2006.01) | |
| *C23C 2/40* | (2006.01) | |

(52) U.S. Cl.
CPC .............. *C21D 9/46* (2013.01); *B32B 15/013* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/02* (2013.01); *C22C 38/06* (2013.01); *C22C 38/22* (2013.01); *C22C 38/32* (2013.01); *C22C 38/38* (2013.01); *C22C 38/60* (2013.01); *C23C 2/02* (2013.01); *C23C 2/06* (2013.01); *C23C 2/40* (2013.01); *C21D 2211/005* (2013.01); *C21D 2211/008* (2013.01)

(58) Field of Classification Search
CPC ............ B32B 15/013; C21D 2211/005; C21D 2211/008; C21D 6/002; C21D 6/005; C21D 6/008; C21D 8/0205; C21D 8/0226; C21D 8/0236; C21D 8/0263; C21D 8/0273; C21D 9/46; C22C 38/001; C22C 38/002; C22C 38/02; C22C 38/04; C22C 38/06; C22C 38/22; C22C 38/32; C22C 38/38; C22C 38/60; C23C 2/02; C23C 2/06; C23C 2/28; C23C 2/40
See application file for complete search history.

(56) References Cited

U.S. PATENT DOCUMENTS

| | | |
|---|---|---|
| 2003/0099857 A1 | 5/2003 | Nomura et al. |
| 2003/0129444 A1 | 7/2003 | Matsuoka et al. |
| 2004/0055667 A1 | 3/2004 | Takada et al. |
| 2011/0017363 A1 | 1/2011 | Kang et al. |
| 2016/0186282 A1 | 6/2016 | Han et al. |
| 2016/0340755 A1 | 11/2016 | Han |
| 2017/0369974 A1 | 12/2017 | Kim et al. |
| 2018/0202020 A1 | 7/2018 | Han et al. |
| 2019/0071746 A1 | 3/2019 | Han et al. |
| 2020/0063233 A1 | 2/2020 | Han et al. |

FOREIGN PATENT DOCUMENTS

| | | |
|---|---|---|
| CN | 101326299 | 12/2008 |
| CN | 101910441 | 12/2010 |
| CN | 102301022 | 12/2011 |
| CN | 104264075 | 1/2015 |
| CN | 107002207 | 8/2017 |
| EP | 1354970 | 10/2003 |
| EP | 2184374 | 5/2010 |

(Continued)

OTHER PUBLICATIONS

Chinese Application No. 201880083621.7 dated May 6, 2021, citing CN 104264075, CN 101326299, CN 101688277, CN 107002207, CN 101910441, CN 102301022, and KR 10-2014-0081626.

(Continued)

*Primary Examiner* — Jenny R Wu
(74) *Attorney, Agent, or Firm* — Cantor Colburn LLP

(57) ABSTRACT

Provided is a steel sheet used as a material for an automotive exterior panel, etc., and a method for manufacturing the same. More particularly, provided is a cold-rolled steel sheet and a hot-dip galvanized steel sheet, which have excellent bake hardening properties, plating adhesion, and anti-aging properties, and a method of manufacturing the same.

11 Claims, No Drawings

(56) References Cited

FOREIGN PATENT DOCUMENTS

| | | | |
|---|---|---|---|
| EP | 3109330 A1 * | 12/2016 | ............... C21D 9/46 |
| JP | 2004052071 | 2/2004 | |
| JP | 2004292891 | 10/2004 | |
| JP | 2005264176 | 9/2005 | |
| JP | 2010024525 | 2/2010 | |
| JP | 2011508085 | 3/2011 | |
| JP | 2012052157 | 3/2012 | |
| JP | 2013064172 | 4/2013 | |
| KR | 20020073564 | 9/2002 | |
| KR | 20030063484 | 7/2003 | |
| KR | 100711468 | 4/2007 | |
| KR | 100711468 B1 * | 4/2007 | |
| KR | 20100060565 | 6/2010 | |
| KR | 2014018580 A * | 2/2014 | |
| KR | 20140081626 | 7/2014 | |
| KR | 101561008 | 10/2015 | |
| KR | 20160078571 | 7/2016 | |
| KR | 20170012865 | 2/2017 | |
| KR | 101767818 | 8/2017 | |
| KR | 101797401 | 11/2017 | |
| WO | 2007067014 | 6/2007 | |
| WO | 2009082078 | 7/2009 | |

OTHER PUBLICATIONS

International Search Report—PCT/KR2018/015027 dated Mar. 8, 2019.
European Search Report—European Application No. 18891096.2 dated Sep. 29, 2020, citing KR 10-0711468, EP 1354970, and EP 2184374.
Japanese Office Action—Japanese Application No. 2020-534876 dated Sep. 28, 2021, citing JP 2013-064172, JP 2009-518541, JP 2012-052157, JP 2010-024525, JP 2011-508085, US 2003/099857, and KR 10-2010-0060565.

* cited by examiner

STEEL SHEET WITH EXCELLENT BAKE HARDENING PROPERTIES AND PLATING ADHESION AND MANUFACTURING METHOD THEREFOR

TECHNICAL FIELD

The present disclosure relates to a steel sheet used as a material for an automobile exterior panel and the like and a method of manufacturing the same, and more particularly, to a cold-rolled steel sheet and a hot-dip galvanized steel sheet, having excellent bake hardening properties, plating adhesion and aging resistance, and a method of manufacturing the same.

BACKGROUND ART

As regulations on the impact stability and fuel efficiency of automobiles are emphasized, high tensile strength steel is being actively used to satisfy both weight reductions and high strength in automobile bodies, and according to this trend, the application of high strength steel to automotive exteriors is expanding.

Currently, most 340 MPa grade bake-hardened steel is applied to automotive exteriors, but some 490 MPa grade steel plates are also applied, and it is expected to be expanded to 590 MPa grade steel plates in the future.

When the steel sheet with increased strength is applied as an external plate, lightweightedness and dent resistance are improved, while there is a disadvantage in that formability is inferior during processing as the strength increases. Accordingly, recently, a customer has requested a steel sheet having a low yield ratio (YR=YS/TS) and excellent ductility in order to compensate for insufficient workability while applying high-strength steel to the external plate.

In addition, to be applied as a material for an automobile exterior panel, it is required to have a certain degree of bake hardening. The bake hardening phenomenon is a phenomenon in which the solid solution carbon and nitrogen activated when coating is baked are adhered to the dislocations generated during the pressing to increase the yield strength. The steel having excellent bake hardening is easy to form before coating baking, and the final product has improved dent resistance. Therefore, it is very ideal as a material for automobile exterior paneling. In addition, it is necessary to have a certain level of aging resistance in order to guarantee aging for a period longer than a certain period in order to be applied as a material for an exterior panel of an automobile.

Patent documents 1 to 3, etc. are known as prior art inventions for improving the workability in a high-tensile steel sheet. Patent document 1 discloses a steel sheet having a composite structure mainly composed of martensite, and discloses a method for manufacturing a high-tensile steel sheet in which fine Cu precipitates of a particle size of 1 to 100 nm are dispersed in the structure to improve workability. However, in this technique, it is necessary to add an excessive amount of Cu of 2 to 5% in order to precipitate fine Cu particles, which may cause red brittleness resulting from Cu and excessively increase manufacturing costs.

Patent Document 2 discloses a composite structural steel sheet comprising ferrite as a main phase, residual austenite as a two-phase phase, and bainite and martensite as a low-temperature transformation phase, and a method for improving the ductility and stretch flangeability of the steel sheet. However, this technique has a problem in that it is difficult to secure plating quality by adding a large amount of Si and Al to secure the retained austenite phase, and it is difficult to secure the surface quality during steelmaking and continuous casting. In addition, due to the transformation induced plasticity, the initial YS value is high, and thus the yield ratio is high, which is disadvantage.

Patent Document 3 is a technique for providing a high-tensile hot-dip galvanized steel sheet having good workability, and discloses a steel sheet comprising a composite of soft ferrite and hard martensite as a microstructure, and a manufacturing method to improve the elongation and r value (Lankford value) thereof. However, this technique is difficult to secure an excellent plating quality by adding a large amount of Si, as well as a problem that the manufacturing cost increases from the addition of a large amount of Ti and Mo.

(Patent Document 1) Japanese Patent Laid-Open Publication No. 2005-264176

(Patent Document 2) Japanese Patent Laid-Open Publication No. 2004-292891

(Patent Document 3) Korean Patent Application Publication No. 2002-0073564

DISCLOSURE

Technical Problem

An aspect of the present disclosure is to provide a steel sheet having excellent bake hardening, plating adhesion and aging resistance, and a method of manufacturing the same.

Technical Solution

According to an aspect of the present disclosure, a steel sheet having excellent bake hardening and plating adhesion, includes: in weight %, 0.005 to 0.08% of carbon (C), 1.3 to 2.3% of manganese (Mn), 0.03% or less (excluding 0%) of phosphorus (P), 0.01% or less (excluding 0%) of sulfur (S), 0.01% or less (excluding 0%) of nitrogen (N), 0.01 to 0.06% of aluminum (sol. Al), 1.0% or less (excluding 0%) of chromium (Cr), 0.1% or less (excluding 0%) of antimony (Sb), at least one selected from the group consisting of silicon (Si): 0.3% or less (excluding 0%), molybdenum (Mo): 0.2% or less (excluding 0%) and boron (B): 0.003% or less (excluding 0%), a remainder of iron (Fe), and unavoidable impurities; and as a microstructure, in area %, 1 to 5% of martensite and remaining ferrite. A relationship (Cgb/Cf) between an Sb average area occupancy ratio (Cgb,%) of grain boundaries of a martensite phase and a ferrite phase and an average Sb area occupancy ratio (Cf,%) in a ferrite phase within 1 μm around the martensite phase, determined by the following relationship 1, at a point of ¼t in a thickness direction of the steel sheet (where t denotes a thickness (mm) of a cold rolled steel sheet, and hereinafter, it is the same), is 3.5 or more, $$Cgb/Cf \geq 3.5 \qquad \text{[Relationship 1]}$$

(where Cgb (%) indicates an Sb average area occupancy ratio of grain boundaries of a martensitic phase and a ferrite phase at a point of ¼t of a cold rolled steel sheet, and Cf (%) indicates an average Sb area occupancy ratio of a ferrite phase within 1 μm around the martensite phase).

In another aspect, the steel sheet may further include a hot-dip galvanized layer disposed on a surface.

According to another aspect of the present disclosure, a method of manufacturing a steel sheet having excellent bake hardening and plating adhesion, includes: reheating a slab including, in weight %, 0.005 to 0.08% of carbon (C), 1.3 to 2.3% of manganese (Mn), 0.03% or less (excluding 0%) of phosphorus (P), 0.01% or less (excluding 0%) of sulfur (S), 0.01% or less (excluding 0%) of nitrogen (N), 0.01 to 0.06% of aluminum (sol.Al), 1.0% or less (excluding 0%) of chromium (Cr), 0.1% or less (excluding 0%) of antimony (Sb), at least one selected from the group consisting of silicon (Si): 0.3% or less (excluding 0%), molybdenum (Mo): 0.2% or less (excluding 0%) and boron (B): 0.003% or less (excluding 0%), a remainder of iron (Fe), and unavoidable impurities; hot rolling the reheated slab at a temperature in a range of 850 to 1150° C. to obtain a hot rolled steel sheet; cooling the hot rolled steel sheet to a temperature range of 550 to 750° C. at an average cooling rate of 10 to 70° C./sec; coiling the cooled hot rolled steel sheet at a temperature in a range of 550 to 750° C.; cold rolling the hot rolled steel sheet to obtain a cold rolled steel sheet; continuously annealing the cold rolled steel sheet under a hydrogen concentration of 3 to 30% by volume at a temperature in a range of $Ac_1+20°$ C. to $Ac_3-20°$ C.; and primary cooling the continuously annealed cold rolled steel sheet to 630 to 670° C. at an average cooling rate of 2 to 10° C./sec.

In another aspect, the method of manufacturing a steel sheet may further include: secondary cooling the primary cooled cold rolled steel sheet until the primary cooled cold rolled steel sheet is immersed in a hot-dip galvanizing bath maintained at 440 to 480° C. at an average cooling rate of 4 to 20° C./sec; immersing the secondary cooled cold rolled steel sheet in a hot-dip galvanizing bath maintained at 440 to 480° C. to obtain a hot-dip galvanized steel sheet; and final cooling the hot-dip galvanized steel sheet to (Ms-100) ° C. or less at an average cooling rate of 3° C./sec or more.

Advantageous Effects

As one of various effects of the present disclosure, the cold rolled steel sheet and the hot-dip galvanized steel sheet according to an exemplary embodiment may have excellent bake hardening, plating adhesion and aging resistance, and thus, may be preferably used as a material for an automobile external panel, and the like.

BEST MODE FOR INVENTION

According to an exemplary embodiment of the present disclosure based on the results of deep research and experiments, there are provided a cold rolled steel sheet and a hot-dip galvanized steel sheet, having excellent bake hardening, plating adhesion and aging resistance, as well as excellent formability by simultaneously securing strength and ductility so that the steel sheets are suitable as materials for an automotive exterior panel.

In an exemplary embodiment of the present disclosure, by appropriately controlling the composition range and microstructure of a steel sheet to secure strength and ductility simultaneously, a cold rolled steel sheet and a hot-dip galvanized steel sheet, having excellent bake hardening, plating adhesion and aging resistance as well as excellent formability, are provided.

According to an exemplary embodiment of the present disclosure, there is provided a steel sheet having improved plating adhesion, by appropriately controlling the composition range and manufacturing conditions of a steel sheet to distribute the appropriate amount of fine martensite in a steel sheet, and by inducing Sb segregation at the interface between martensite and ferrite grain boundaries to suppress surface elution of Mn, Cr or the like during annealing.

Hereinafter, a steel sheet having excellent bake hardening and plating adhesion according to an exemplary embodiment of the present disclosure will be described.

A steel sheet having excellent bake hardening and plating adhesion according to an exemplary embodiment includes, in weight %, 0.005 to 0.08% of carbon (C), 1.3 to 2.3% of manganese (Mn), 0.03% or less (excluding 0%) of phosphorus (P), 0.01% or less (excluding 0%) of sulfur (S), 0.01% or less (excluding 0%) of nitrogen (N), 0.01 to 0.06% of aluminum (sol.Al), 1.0% or less (excluding 0%) of chromium (Cr), 0.1% or less (excluding 0%) of antimony (Sb), at least one selected from the group consisting of silicon (Si): 0.3% or less (excluding 0%), molybdenum (Mo): 0.2% or less (excluding 0%) and boron (B): 0.003% or less (excluding 0%), a remainder of iron (Fe), and unavoidable impurities, and includes, as a microstructure, in area %, 1 to 5% of martensite and remaining ferrite. A relationship (Cgb/Cf) between an Sb average area occupancy ratio (Cgb,%) of grain boundaries of a martensite phase and a ferrite phase and an average Sb area occupancy ratio (Cf) in a ferrite phase within 1 μm around the martensite phase, determined by the following relationship 1, at a point of ¼t in a thickness direction of the steel sheet (where t denotes a thickness (mm) of a cold rolled steel sheet, and hereinafter, it is the same), is 3.5 or more.

$$Cgb/Cf \geq 3.5 \quad \text{[Relationship 1]}$$

(where Cgb (%) indicates an Sb average area occupancy ratio of grain boundaries of a martensitic phase and a ferrite phase at a point of ¼t of a cold rolled steel sheet, and Cf (%) indicates an average Sb area occupancy ratio of a ferrite phase within 1 μm around the martensite phase).

Hereinafter, the alloy component and the preferred content range of the steel sheet will be described in detail. It should be noted in advance that the content of each component described below is on a weight basis unless otherwise specified.

C: 0.005 to 0.08%

Carbon (C) is an essential element added to secure the desired composite structure in the present disclosure. In general, as the content of carbon increases, the formation of martensite is easy, which is advantageous for the production of composite structure steel, but to secure the intended strength and yield ratio (yield strength/tensile strength), it is required to manage with an appropriate content. If the carbon content is less than 0.005%, it may be difficult to secure the target strength in the present disclosure, and it may be difficult to form an appropriate level of martensite. On the other hand, if the content exceeds 0.08%, there is a disadvantage in that the formation of grain boundary bainite upon cooling after annealing is promoted, the yield ratio of steel is increased, and warping and surface defects are easily generated during processing into automobile components. Therefore, in the present disclosure, the content of carbon is set to 0.005 to 0.08%, and, in more detail, to 0.007 to 0.06%.

Mn: 1.3-2.3%

Manganese (Mn) is an element that improves hardenability in composite structure steel, and is an element that plays an important role in forming martensite. If the manganese content is less than 1.3%, it is difficult to manufacture the composite structure steel because martensite may not be formed. On the other hand, if it exceeds 2.3%, the material becomes unstable due to excessive formation of martensite, and a manganese band is formed in the structure, resulting in processing cracks, and there is a problem that the risk of plate breakage significantly increases. In addition, there is a problem that the manganese oxide is eluted on the surface during annealing, which greatly inhibits plating properties. Therefore, in the present disclosure, the content of manganese is controlled to be 1.3 to 2.3%, and, in more detail, to be 1.7 to 2.1%.

P: 0.03% or Less (Excluding 0%)

Phosphorus (P) is the most advantageous element for securing strength without significantly impairing formability, but when excessively added, the possibility of brittle fracture is greatly increased, which greatly increases the probability of slab plate fracture during hot rolling, deteriorating the surface characteristics of plating. In the present disclosure, the phosphorus content is controlled to be 0.03% or less.

S: 0.01% or Less (Excluding 0%)

Sulfur (S) is an inevitably contained impurity in the steel, and it may be desirable to manage the content as low as possible. In detail, sulfur in the steel increases the possibility of generating red brittleness, so the S content is managed to be 0.01% or less.

N: 0.01% or Less (Excluding 0%)

Nitrogen (N) is an inevitably contained impurity in the steel, and it is important to manage the content as low as possible, but for this, there is a problem that the refining cost of the steel increases rapidly. Therefore, the operating conditions are managed to be 0.01% or less which is the possible operation condition.

Al (sol.Al): 0.01 to 0.06%

Al (sol.Al) is an element added for particle size refinement and deoxidation, and if the content thereof is less than 0.01%, aluminum-killed steel may not be manufactured in a normal stable state, whereas if the content exceeds 0.06%, it is advantageous to increase the strength due to the effect of grain refinement, but there is a problem that the inclusion is excessively formed during the steelmaking continuous casting, which increases the possibility of surface defects in the plated steel sheet, and also causes a rapid increase in manufacturing cost. Therefore, in the present disclosure, the content of acid-soluble aluminum (sol.Al) is controlled to be 0.01 to 0.06%.

Cr: 1.0% or Less (Excluding 0%)

Chromium (Cr) is a component having properties similar to manganese, and is an element added to improve the strength of steel as well as improving the hardenability of steel. In addition, chromium assists in the formation of martensite, and forms coarse Cr-based carbides such as $Cr_{23}C_6$ during hot rolling to precipitate the amount of solid-solution carbon in steel at an appropriate level or less, thereby suppressing the occurrence of yield point elongation (YP-El). Thus, Cr is an element that is advantageous for the production of composite structure steel with a low yield ratio. In addition, chromium is an element that is advantageous for manufacturing high-strength composite structure steel having high ductility by minimizing ductility drop compared to increase in strength. However, if the content exceeds 1.0%, the martensitic structure fraction may be excessively increased, resulting in a decrease in strength and elongation, and thus, the chromium content is controlled to be 1.0% or less (excluding 0%) in the present disclosure.

Sb: 0.1% or Less (Excluding 0%)

Antimony (Sb) is an element that plays an important role in the present disclosure. In the present disclosure, the carbon is lowered as much as possible, and preferably, 0.005 to 0.04%, and a fine M (martensite) phase is distributed in the steel by using a hardenable element such as Mn and Cr, or the like, thereby producing steel having excellent bake hardening and aging resistance. However, the Mn and Cr are eluted on a surface layer as Mn and Cr-based oxides during annealing to deteriorate adhesion during plating, which may cause plating peeling problems. Thus, by adding a small amount of Sb to preferentially segregate at the grain boundary of the M (martensite) phase, Mn, Cr and the like may be prevented from moving along the grain boundary, such that the plating surface quality may be finally improved. Even when a small amount of Sb is added, a sufficient effect may be obtained, and a lower limit is not specifically set except for 0%. If the Sb content exceeds 0.1%, there is a possibility of an increase in alloy cost and surface cracking in hot rolling due to the presence of excess Sb. Therefore, the upper limit of the Sb content is limited to 0.1%. In more detail, it may be advantageous to limit the Sb content to 0.005 to 0.04%.

At least one selected from the group consisting of Si: 0.3% or less (excluding 0%), Mo: 0.2% or less (excluding 0%), and B: 0.003% or less (excluding 0%) is included.

Si: 0.3% or Less (Excluding 0%)

Silicon (Si) contributes to the strength increase of the steel sheet by solid solution strengthening, but in the present disclosure, it is not intentionally added, and even in the case in which silicon is not added, there is no significant obstacle in securing physical properties. However, 0% may be excluded considering the amount inevitably added during manufacturing. On the other hand, if the silicon content exceeds 0.3%, there is a problem in that the surface properties of the plating are inferior. In the present disclosure, the silicon content is controlled to be 0.3% or less.

Mo: 0.2% or Less (Excluding 0%)

Molybdenum (Mo) may be added to delay the transformation of austenite into pearlite and to improve ferrite refinement and strength of steel. In addition, molybdenum also helps to improve the hardenability of steel. However, if the content of molybdenum exceeds 0.2%, there is a problem in that, not only the economic efficiency is lowered by causing a rapid increase in manufacturing cost, but also the ductility of the steel is lowered. In the present disclosure, the content of molybdenum is controlled to be 0.2% or less. On the other hand, the lower limit of Mo is not particularly limited because the effect is sufficiently high even when a small amount is added. However, in more detail, the Mo content may be 0.005 to 0.1%.

B: 0.003% or Less (Excluding 0%)

Boron (B) is an element that may be added to prevent secondary processing embrittlement caused by phosphorus in the steel. Even if boron is not added, there is no significant obstacle in securing physical properties. On the other hand, if the content of boron exceeds 0.003%, ductility deterioration of the steel may be caused. Therefore, in the present disclosure, the content of boron is controlled to be 0.003% or less.

In addition, a remainder of Fe and unavoidable impurities are included. However, in the normal manufacturing process, impurities that are not intended from the raw material or the surrounding environment may inevitably be mixed, and therefore cannot be excluded. These impurities are known to anyone skilled in the art, and thus, are not specifically mentioned in this specification. In addition, the addition of effective ingredients other than the above composition is not excluded.

A steel sheet having excellent bake hardening and plating adhesion according to an exemplary embodiment of the present disclosure includes, a microstructure thereof, in area %, 1 to 5% of martensite and the remaining ferrite.

If the area ratio of martensite is less than 1%, it is difficult to form a composite structure, and thus, difficult to obtain a steel sheet having a low yield ratio. On the other hand, if it exceeds 5%, there is a problem in that it is difficult to secure required workability due to an excessive increase in strength.

In an experimental result according to an example, if the content of martensite in the steel sheet was less than 1%, solid carbon contained in the steel did not sufficiently aggregate in the martensite, and most of solid carbon was present on the ferrite to obtain the experimental result in which room temperature aging resistance was reduced. In case of exceeding 5%, additional alloys need to be added and the yield strength is excessively increased, which increases crack generation during processing and also relatively deteriorates ductility, and thus, there is a limit to the application of automotive components that require high workability. Therefore, the upper limit of martensite is limited to 5%.

Therefore, the martensite may be preferably 1 to 5% by area, in more detail, 1.5 to 3% by area.

In the steel sheet according to the exemplary embodiment, a relationship (Cgb/Cf) between an Sb average area occupancy ratio (Cgb,%) of grain boundaries of a martensite phase and a ferrite phase and an average Sb area occupancy ratio (Cf,%) in a ferrite phase within 1 μm around the martensite phase, determined by the following relationship 1, at a point of ¼t in a thickness direction of the steel sheet (where t denotes a thickness (mm) of a cold rolled steel sheet), satisfies 3.5 or more.

$$Cgb/Cf \geq 3.5 \quad \text{[Relationship 1]}$$

(where Cgb (%) indicates an Sb average area occupancy ratio of grain boundaries of a martensitic phase and a ferrite phase at a point of ¼t of a cold rolled steel sheet, and Cf (%) indicates an average Sb area occupancy ratio of a ferrite phase within 1 μm around the martensite phase).

According to the experiment in the present disclosure, the relationship between the solid-solution Sb area occupancy ratio (Cgb) present at the martensite and ferrite grain boundaries and the average Sb area occupancy ratio (Cf) in the ferrite within 1 μm around the martensite phase was 3.5 or more, and in this state, it was confirmed that the properties of the plating adhesion was very excellent. Of course, the higher the value in relationship (1) is, the more advantageous there is, and thus, the upper limit is not particularly limited. However, if the value is less than 3.5, Sb is not sufficiently segregated at the grain boundary, and thus, Mn, Cr, and the like act favorably on the diffusion along the grain boundary, to be easily eluted to the surface during annealing, resulting in the inferior plating adhesion. In detail, Sb is present in the solid solution state at the grain boundary, and thus acts to suppress the movement of Mn, Cr and the like along the grain boundary to the steel sheet surface.

Also, by adding Sb, solid solution carbon is aggregated inside the fine martensite (M) phase as much as possible to increase room temperature aging resistance. When Sb is segregated to the martensite and ferrite grain boundaries to the maximum, the solid solution carbon contained in the steel is further aggregated into the martensite, and the movement of the solid solution carbon into ferrite at room temperature is further suppressed to improve room temperature aging resistance. This is because, if the solid solution carbon content in ferrite is high, the yield point elongation (YP-El) occurs at the tensile test at room temperature, causing a problem in which it is difficult to guarantee aging for 6 months or more at room temperature.

The steel sheet may have a yield strength of 210 to 270 MPa and a yield ratio (YS/TS) of 0.6 or less.

A steel sheet having excellent bake hardening and plating adhesion according to another exemplary embodiment of the present disclosure includes the steel sheet described above and a hot-dip galvanized layer formed on the surface of the steel sheet.

In the present disclosure, the composition of the hot-dip galvanized layer is not particularly limited, and the hot-dip galvanized layer may be a pure galvanized layer or a zinc-based alloy plating layer containing Si, Al, Mg, or the like. Further, the hot-dip galvanized plating layer may be an alloyed hot-dip galvanized layer.

The plated steel sheet including the hot-dip galvanized layer is a hot-dip galvanized steel sheet, and the plated steel sheet may have a yield strength of 210 to 270 MPa and a yield ratio (YS/TS) of 0.6 or less.

The steel sheet of the present disclosure described above may be manufactured by various methods, and the manufacturing method is not particularly limited. However, as a preferred example, the steel sheet may be manufactured by the following method.

Hereinafter, a method of manufacturing a steel sheet having excellent bake hardening and plating adhesion according to another exemplary embodiment of the present disclosure will be described in detail.

A method of manufacturing a steel sheet having excellent bake hardening and plating adhesion according to another exemplary embodiment of the present disclosure includes: reheating a slab including, in weight %, 0.005 to 0.08% of carbon (C), 1.3 to 2.3% of manganese (Mn), 0.03% or less (excluding 0%) of phosphorus (P), 0.01% or less (excluding 0%) of sulfur (S), 0.01% or less (excluding 0%) of nitrogen (N), 0.01 to 0.06% of aluminum (sol.Al), 1.0% or less (excluding 0%) of chromium (Cr), 0.1% or less (excluding 0%) of antimony (Sb), at least one selected from the group consisting of silicon (Si): 0.3% or less (excluding 0%), molybdenum (Mo): 0.2% or less (excluding 0%) and boron (B): 0.003% or less (excluding 0%), a remainder of iron (Fe), and unavoidable impurities; hot rolling the reheated slab at a temperature in a range of 850 to 1150° C. to obtain a hot rolled steel sheet; cooling the hot rolled steel sheet to a temperature range of 550 to 750° C. at an average cooling rate of 10 to 70° C./sec; coiling the cooled hot rolled steel sheet at a temperature in a range of 550 to 750° C.; cold rolling the hot rolled steel sheet to obtain a cold rolled steel sheet; continuously annealing the cold rolled steel sheet under a hydrogen concentration of 3 to 30% by volume at a temperature in a range of $Ac_1+20°$ C. to $Ac_3-20°$ C.; and primary cooling the continuously annealed cold rolled steel sheet to 630 to 670° C. at an average cooling rate of 2 to 10° C./sec.

Slab Reheating Operation

First, the slab having the aforementioned component system is reheated. It may be desirable to set the slab reheating temperature to 1180 to 1350° C.

This operation is performed to smoothly carry out the subsequent hot rolling process and to sufficiently obtain the properties of the target steel sheet. At this time, if the heating temperature is less than 1180° C., oxides such as Mn, Cr and the like are not sufficiently re-dissolved, which causes material deviation and surface defects after hot rolling, so the reheating temperature is preferably 1180° C. or higher. If it exceeds 1350° C., since the strength is reduced by abnormal grain growth of the austenite grains, it may be preferable to limit to 1180 to 1350° C.

Operation of Obtaining Hot Rolled Steel Sheet

The hot-rolled steel slab is hot-rolled at a temperature in the range of 850 to 1150° C. to obtain a hot-rolled steel sheet. At this time, the hot finishing rolling temperature is equal to or higher than an $Ar_3$ temperature.

If the hot rolling is started at a temperature higher than 1150° C., the temperature of the hot rolled steel sheet becomes high, the grain size becomes coarse, and the surface quality of the hot rolled steel sheet is deteriorated. In addition, if the hot rolling is finished at a temperature lower than 850° C., development of an elongated grain and high yield ratio are obtained due to excessive recrystallization delay, and thus, cold rollability is inferior and shear workability is also deteriorated.

Cooling and Coiling Operations of Hot Rolled Steel Sheet

The hot-rolled steel sheet is cooled to a temperature range of 550 to 750° C. at an average cooling rate of 10 to 70° C./sec and is coiled at a temperature in the range of 550 to 750° C.

In this case, if the hot-rolled steel sheet is cooled to a temperature below 550° C. and coiled, a bainite phase and a martensite phase are formed in the steel, and the material of the steel is deteriorated. If the hot-rolled steel sheet is cooled to a temperature higher than 750° C. and coiled, coarse ferrite grains are formed, and coarse carbide and nitride are easily formed, and thus, the steel material is inferior. In addition, if the average cooling rate is less than 10° C./sec at the time of cooling, coarse ferrite grains are formed, resulting in non-uniform microstructure, and if the average cooling rate exceeds 70° C./sec, bainite phases are easily formed and the microstructure in the thickness direction of the sheet is also non-uniformity, thereby deteriorating the shear workability of the steel.

Operation of Obtaining Cold Rolled Steel

The hot rolled steel sheet cooled and coiled as described above is cold rolled to obtain a cold rolled steel sheet.

When cold rolling is performed, the cold rolling reduction may be 40 to 80%. If the cold rolling reduction is less than 40%, it may be difficult to secure the target thickness, and shape correction of the steel sheet may be difficult. On the other hand, if the cold rolling reduction exceeds 80%, cracks may occur in the edge portion of the steel sheet, and a cold rolling load may be caused.

The cold rolling may be performed, for example, using a rolling mill composed of 5 or 6 stands, and in this case, an initial stand rolling reduction ratio may be set to 25 to 37%.

If the initial stand reduction ratio is less than 25%, the low reduction ratio not only causes limitation in controlling the shape of the hot rolled steel sheet, but also uniform martensite in the structure may not be formed due to non-uniformity of the martensite nucleation site during cooling after annealing. In the case of exceeding 37%, the equipment load due to the increase in the initial stand rolling reduction ratio may be caused, and thus, the initial stand rolling reduction ratio of the cold rolling mill may be limited to 25 to 37%. It may be more preferable to set the initial stand reduction ratio to 30 to 35%.

Continuous Annealing Operation of Cold Rolled Steel

The cold-rolled steel sheet is continuously annealed under a hydrogen concentration of 3 to 30% by volume at a temperature in the range of $Ac_1+20°$ C. to $Ac_3-20°$ C.

This process is performed to form ferrite and austenite simultaneously with recrystallization, and to distribute carbon.

In the present disclosure, in order to produce a steel sheet to secure the aging resistance at room temperature by controlling the fine martensite in the steel to be in the range of 1 to 5 area % and to obtain bake hardening of 35 MPa or more at a baking temperature (generally, at 170° C. for 20 minutes); the condition of annealing temperature is $Ac_1+20°$ C. to $Ac_3-20°$ C., and the range of hydrogen concentration in the furnace atmosphere is limited to 3 to 30%.

If the hydrogen concentration is less than 3% by volume, surface enrichment of elements having high oxygen affinity such as Si, Mn, and B contained in the steel is easily generated, thereby causing dent and plating defects, whereas if it exceeds 30% by volume, since the effect of suppressing the defects of the above elements not only reaches the limit, but is disadvantageous in terms of manufacturing costs. Therefore, it may be desirable to set the hydrogen concentration to 3 to 30% by volume.

On the other hand, if the annealing temperature is less than $Ac_1+20°$ C., the fraction of austenite in the low two-phase region (ferrite+austenite) is insufficient, so that fine martensite is not sufficiently formed upon cooling after the final annealing, and thus, the bake hardenability required in the present disclosure may not be obtained. In case of exceeding $Ac_3-20°$ C., the austenite fraction is too high during the two-phase annealing, and thus, the martensite size becomes coarse after annealing cooling, and the fraction exceeds 10%, so that the strength rises rapidly. In this case, since the possibility of occurrence of processing cracks during the components forming increases, it may be preferable to limit the annealing temperature to $Ac_1+20°$ C. to $Ac_3-20°$ C.

The $Ac_1$ and $Ac_3$ may be obtained, for example, as in the following relationship 2, respectively.

$$Ac_1(° C.)=723-10.7[Mn]-16.9[Ni]+29.1[Si]+16.9[Cr]$$
$$Ac_3(° C.)=910-203\sqrt{C}-15.2Ni+44.7Si+104V+31.5Mo+13.1W \quad \text{[Relationship 2]}$$

(where [C], [Mn], [Cu], [Cr], [Ni], [W] and [Mo] each indicates the weight percent of the corresponding element)

Primary Cooling Operation of Continuous Annealed Cold Rolled Steel Sheet

The continuously annealed cold rolled steel sheet is first cooled to 630 to 670° C. at an average cooling rate of 2 to 10° C./sec.

In the present disclosure, the higher the primary cooling end temperature is controlled to be or the slower the primary cooling rate is controlled to be, the higher the tendency for uniformity and coarsening of ferrite is, which is advantageous for securing ductility of steel.

In addition, the present disclosure is characterized in that it gives a sufficient time for carbon to diffuse into austenite during primary cooling, which is significantly meaningful in the present disclosure. In more detail, in the two-phase region, carbon diffuses and migrates to austenite having a high carbon concentration. The higher the temperature is and the longer the time is, the higher the degree of diffusion is. If the primary cooling end temperature is less than 630° C., pearlite or bainite may be formed due to too low temperature, which increases the yield ratio and increases the tendency to cause cracks during processing. On the other hand, if the primary cooling end temperature exceeds 670° C., a large amount of ferrite is formed upon cooling and the austenite content for martensite formation is small, so that the final martensite content of 1 to 5% may not be effectively controlled.

In addition, if the primary cooling rate is less than 2° C./sec, it is disadvantageous in terms of productivity, and the ferrite fraction increases, resulting in a lack of austenite content for martensite formation, whereas if it exceeds 10° C./sec, bainite is formed and increases the yield strength, which entails material inferiority. In the present disclosure, it may be preferable to suppress bainite or pearlite formation as much as possible, other than fine martensite.

According to another exemplary embodiment of the present disclosure, a method of manufacturing a hot-dip galvanized steel sheet having excellent bake hardening properties and plating adhesion, in addition to the above-described method of manufacturing a cold rolled steel sheet, further includes: secondary cooling the primary cooled cold rolled steel sheet until the primary cooled cold rolled steel sheet is immersed in a hot-dip galvanizing bath maintained at 440 to 480° C. at an average cooling rate of 4 to 20° C./sec; immersing the secondary cooled cold rolled steel sheet in a hot-dip galvanizing bath maintained at 440 to 480° C. to obtain a hot-dip galvanized steel sheet; and final cooling the hot-dip galvanized steel sheet to (Ms-100) ° C. or less at an average cooling rate of 3° C./sec or more.

Secondary Cooling Operation of Cold Rolled Steel Sheet

As described above, the primary cooled cold rolled steel sheet is secondary cooled until immersed in a hot-dip galvanizing bath maintained at 440 to 480° C. at an average cooling rate of 4 to 20° C./sec.

According to the research of the present inventors, if martensite is formed before passing the temperature range of a normal hot-dip galvanizing bath, 440 to 480° C., coarse martensite is formed on the finally obtained cold rolled steel sheet, and thus, a low yield ratio may not be obtained. If the secondary cooling rate exceeds 20° C./sec, a portion of martensite may be generated during the secondary cooling, and a threading speed may increase in productivity, resulting in problems such as plate shape distortion. On the other hand, if the secondary cooling rate is less than 4° C./sec, fine bainite may be formed due to too slow cooling rate, causing a material deviation in the width direction, and therefore, the plate shape is not good. Thus, it may be preferable to control the secondary cooling rate to 4 to 20° C./sec.

Operation of Obtaining Hot-Dip Galvanized Steel Sheet

As described above, the secondary cooled cold rolled steel sheet is immersed in a hot-dip galvanizing bath maintained at 440 to 480° C. to obtain a hot-dip galvanized steel sheet.

In the present disclosure, the composition of the hot-dip galvanizing bath is not particularly limited, and may be a pure galvanizing bath or a zinc-based alloy plating bath including Si, Al, Mg, and the like.

Final Cooling Operation of Hot-Dip Galvanized Steel Sheet

The hot-dip galvanized steel sheet is finally cooled to (Ms-100) ° C. or less at an average cooling rate of 3° C./sec or more.

The (Ms-100) ° C. is a cooling condition for forming martensite.

The theoretical temperature of the Ms may be obtained, for example, by the following relationship 3.

$$Ms(° C.)=539-423[C]-30.4[Mn]-12.1[Cr]-17.7[Ni]-7.5[Mo] \quad [Relationship 3]$$

(where [C], [Mn], [Cr], [Ni] and [Mo] each indicate the weight percent of the corresponding element)

If the final cooling end temperature is greater than (Ms-100)° C., fine martensite may not be obtained, and a plate shape defect problem may be caused.

On the other hand, if the average cooling rate is less than 3° C./sec, martensite is not only irregularly formed at the grain boundary or in the grain due to a cooling rate that is too slow, but also the formation ratio of martensite in grain boundaries is low, compared to martensite in grains. Therefore, the steel of a low yield ratio cannot be produced. The upper limit value of the average cooling rate is not particularly limited as there is no problem in the facility characteristics as much as possible.

Operation of Obtaining Alloyed Hot-Dip Galvanized Steel Sheet

On the other hand, if necessary, before the final cooling, an operation of obtaining an alloyed hot-dip galvanized steel sheet by alloying heat treatment of the hot-dip galvanized steel sheet may further be included.

In the present disclosure, the conditions for the alloying heat treatment process are not particularly limited, and may be any ordinary conditions. As an example, an alloying heat treatment process may be performed at a temperature in a range of 500 to 540° C.

Temper Rolling Operation

In addition, if necessary, an operation of temper rolling the final cooled hot-dip galvanized steel sheet or alloyed hot-dip galvanized steel sheet may further be included.

In the case of temper rolling, a large amount of dislocation is formed in the ferrite located around the martensite, so that the bake hardening property may be further improved.

In this case, the reduction ratio may be preferably 0.3 to 1.6%, and, in more detail, 0.5 to 1.4%. If the reduction ratio is less than 0.3%, a sufficient dislocation is not formed, and it is disadvantageous in terms of plate shape, and in detail, there is a possibility that a plating surface defect may occur. On the other hand, if the reduction ratio exceeds 1.6%, it is advantageous in terms of dislocation formation, but side effects such as occurrence of plate breakage may occur due to limitations in facility capacity.

Hereinafter, the present disclosure will be described in more detail through examples. However, the following examples are only examples for describing the present disclosure in more detail, and do not limit the scope of the present disclosure.

MODE FOR INVENTION

Example

After the steel slab having the alloy composition illustrated in Table 1 was prepared, the hot-dip galvanized steel sheet (a GI steel sheet) and the alloyed hot-dip galvanized steel sheet (a GA steel sheet) were manufactured using the manufacturing processes illustrated in Tables 2 and 3 below. In this case, hot-dip galvanizing was performed using a general zinc-based plating bath, and alloying heat treatment was also performed under normal conditions (500 to 540° C.).

For reference, in Table 1, inventive steels 1, 2, 4 and 5 and comparative steels 1 and 2 correspond to alloyed hot-dip galvanized steel sheets, and inventive steels 3, 6 and 7 correspond to hot-dip galvanized steel sheets. Comparative steel 1 is usually a BH steel using ultra-low carbon steel, and comparative steel 2 is a high carbon TRIP series steel.

Microstructure was observed for each of the plated steel sheets prepared as described above, physical properties were evaluated, and the results are illustrated in Table 4 below.

In Table 4 below, the microstructure fraction was obtained by observing martensite and bainite through Lepelar corrosion using a optical microscope at a ¼ t (t: steel sheet thickness (mm)) point in a plate thickness, and again observing using the SEM (3,000 times), and then, by measuring the size and distribution amount of martensite and bainite with the average value three times through Count Point operation, and by estimating the phases excluding these structures by the ferrite content. In Table 4, the tensile test for each specimen was conducted in the C direction using JIS standards. In Table 4 below, YS represents the yield strength and YR represents the yield ratio.

On the other hand, bake hardening (L-BH) was measured under baking conditions of (170° C.×20 min) and evaluated by the difference in yield strength after 2% pre-strain, and aging resistance [YP-El (%)] was evaluated by measuring YP-El (%) during the tensile test after maintaining for 1 hour at 100° C., in which when YP-El does not appear at all, it was evaluated as having excellent aging resistance at room temperature.

In addition, the evaluation of Cgb/Cf values of grain boundaries was performed using APT equipment that may visualize the distribution of ingredients in three dimensions with sub-nanometer spatial resolution.

To quantitatively evaluate the ratio of Sb occupied concentrations present in ferrite from the martensite and ferrite grain boundaries, using APT Carbon profile (Atom Probe Tomography), the number of solid-solution Sb in a 100 nm square was measured, based on grain boundaries and ferrite inside, by a count method, and was calculated as the average of 3 times.

The unplated evaluation was conducted by visual observation, and the relative evaluation was performed on a scale of 1 to 5 depending on the degree of generation of unplating. The grades of 1 to 2 refer to securing the quality of an external panel material.

Plating adhesion was evaluated by the sealer bending test. The sealer bending test was performed by applying chemicals to the surface of the steel sheet, heating at 175° C.×25 minutes, cooling to room temperature, and then, evaluating whether or not the base iron and the plating layer were peeled during the test by 90 degree bending.

TABLE 1

| Steel | Cold rolled steel sheet composition (weight %) | | | | | | | | | | |
|---|---|---|---|---|---|---|---|---|---|---|---|
|  | C | Mn | Si | Cr | P | S | N | Sol. Al | Sb | Mo | B |
| Inventive Steel 1 | 0.007 | 2.22 | 0.007 | 0.05 | 0.004 | 0.005 | 0.003 | 0.018 | 0.003 | — | 0.0004 |
| Inventive Steel 2 | 0.009 | 1.96 | 0.004 | 0.48 | 0.003 | 0.005 | 0.004 | 0.04 | 0.002 | — | 0.0006 |
| Inventive Steel 3 | 0.012 | 2.12 | 0.012 | 0.43 | 0.00 | 0.007 | 0.004 | 0.05 | 0.02 | 0.07 | — |
| Inventive Steel 4 | 0.014 | 1.85 | 0.021 | 0.81 | 0.002 | 0.004 | 0.003 | 0.041 | 0.023 | — | 0.0021 |
| Inventive Steel 5 | 0.032 | 1.63 | 0.031 | 0.63 | 0.001 | 0.003 | 0.004 | 0.052 | 0.031 | 0.18 | — |
| Inventive Steel 6 | 0.035 | 1.58 | 0.008 | 0.52 | 0.003 | 0.004 | 0.006 | 0.025 | 0.001 | 0.08 | 0.0008 |
| Inventive Steel 7 | 0.072 | 1.38 | 0.007 | 0.06 | 0.005 | 0.006 | 0.003 | 0.041 | 0.004 | 0.03 | 0.0009 |
| Comparative Steel 1 | 0.0023 | 0.15 | 0.05 | 0.003 | 0.006 | 0.004 | 0.002 | 0.032 | — | — | — |
| Comparative Steel 2 | 0.12 | 1.65 | 0.80 | 1.42 | 0.005 | 0.007 | 0.005 | 0.05 | — | 0.21 | 0.0018 |

TABLE 2

| | Hot Rolling | | | | Cold Rolling | |
|---|---|---|---|---|---|---|
| Steel | Reheating temperature (° C.) | Finish rolling temperature (° C.) | Coiling temperature (° C.) | Cooling speed before coiling (° C./sec) | Cold rolling reduction ratio(%) | Initial cold rolling stand reduction ratio(%) |
| Inventive Steel 1 | 1184 | 885 | 565 | 25 | 54 | 28 |
|  | 1190 | 893 | 556 | 31 | 55 | 26 |
| Inventive Steel 2 | 1185 | 908 | 651 | 26 | 61 | 28 |
|  | 1187 | 908 | 645 | 33 | 61 | 29 |
| Inventive Steel 3 | 1210 | 894 | 720 | 45 | 73 | 31 |
|  | 1212 | 897 | 718 | 62 | 72 | 33 |
| Inventive Steel 4 | 1195 | <u>845</u> | 584 | 63 | 73 | 32 |
|  | 1197 | 932 | 589 | 18 | 75 | 29 |
| Inventive Steel 5 | 1225 | 932 | <u>485</u> | 15 | <u>38</u> | <u>21</u> |
|  | 1223 | 918 | 631 | <u>72</u> | 42 | <u>39</u> |
| Inventive Steel 6 | 1196 | 897 | 686 | 38 | <u>81</u> | 36 |
|  | 1194 | 896 | 643 | 36 | 78 | 35 |
| Inventive Steel 7 | 1201 | 894 | 684 | 51 | 35 | 34 |
|  | 1205 | 893 | 642 | 56 | 68 | 33 |
| Comparative Steel 1 | 1185 | 918 | 672 | 35 | 79 | <u>45</u> |
|  | 1192 | 892 | <u>525</u> | 32 | 65 | 36 |
| Comparative Steel 1 | 1189 | 898 | 684 | 28 | 63 | 35 |

TABLE 3

| | Annealing | | Cooling | | | | | | |
|---|---|---|---|---|---|---|---|---|---|
| Steel | Annealing Temperature (° C.) | Hydrogen concentration in furnace (%) | Primary cooling rate (° C./sec.) | Primary cooling end temperature (° C.) | Secondary cooling rate (° C./sec.) | Secondary cooling end temperature (° C.) | Final cooling rate (° C./sec.) | Final cooling end temperature (° C.) | Remarks |
| Inventive Steel 1 | 745 | 5.2 | 2.8 | 650 | 4.3 | 450 | 4.4 | Room Temperature | Inventive Example 1 |
|  | 758 | 5.5 | 2.4 | 650 | 4.5 | 450 | 5.2 | Room Temperature | Inventive Example 2 |
| Inventive Steel 2 | 768 | 6.2 | 3.5 | 650 | 4.1 | 450 | 6.2 | Room Temperature | Inventive Example 3 |
|  | 792 | 6.3 | 3.6 | 650 | 4.2 | 450 | 6.3 | Room Temperature | Inventive Example 4 |
| Inventive Steel 3 | 825 | 5.8 | 4.9 | 650 | 5.2 | 450 | 9.1 | Room Temperature | Inventive Example 5 |
|  | 812 | 5.2 | 9.5 | 650 | 6.3 | 450 | 9.3 | Room Temperature | Inventive Example 6 |
| Inventive Steel 4 | <u>675</u> | 6.3 | 5.6 | 650 | 9.1 | 450 | 5.2 | Room Temperature | Comparative Example 1 |
|  | 821 | 3.5 | 5.8 | 650 | 8.5 | 450 | 7.8 | Room Temperature | Inventive Example 7 |
| Inventive Steel 5 | 813 | 3.6 | 6.2 | 650 | 11.4 | 450 | 7.2 | Room Temperature | Comparative Example 2 |
|  | 839 | 3.1 | 8.5 | 650 | 12.6 | 450 | 6.1 | Room Temperature | Comparative Example 3 |
| Inventive Steel 6 | 841 | <u>2.5</u> | 7.3 | 650 | 8.5 | 450 | 5.3 | Room Temperature | Comparative Example 4 |
|  | 834 | <u>38.1</u> | <u>16.5</u> | 650 | 7.2 | 450 | 8.3 | Room Temperature | Comparative Example 5 |
| Inventive Steel 7 | 846 | 3.5 | <u>1.8</u> | 650 | <u>2.8</u> | 450 | <u>1.7</u> | Room Temperature | Comparative Example 6 |
|  | 835 | 3.5 | <u>17.5</u> | 650 | <u>23</u> | 450 | 8.9 | Room Temperature | Comparative Example 7 |
| Comparative Steel 1 | 845 | 3.6 | 4.5 | 650 | 6.1 | 450 | 5.3 | Room Temperature | Comparative Example 8 |
| Comparative Steel 2 | 802 | 4.1 | 3.8 | 650 | 6.5 | 450 | 5.4 | Room Temperature | Comparative Example 9 |
|  | 779 | 4.5 | 4.1 | 650 | 7.8 | 450 | 3.8 | Room Temperature | Comparative Example 10 |

TABLE 4

| Steel | ① | ② | ③ | YP-El (%) | L-BH (MPa) | YS (MPa) | YR | ④ Unplated (grade) | ⑤ Plating Adhesion | Remarks |
|---|---|---|---|---|---|---|---|---|---|---|
| Inventive Steel 1 | 2.7 | 0 | 3.8 | 0 | 42 | 218 | 0.56 | 1 | ○ | Inventive Example 1 |
|  | 1.2 | 0 | 4.2 | 0 | 44 | 219 | 0.58 | 2 | ○ | Inventive Example 2 |
| Inventive Steel 2 | 3.3 | 0 | 4.1 | 0 | 48 | 221 | 0.56 | 1 | ○ | Inventive Example 3 |
|  | 3.2 | 0 | 3.9 | 0 | 39 | 223 | 0.57 | 2 | ○ | Inventive Example 4 |
| Inventive Steel 3 | 4.2 | 0 | 5.1 | 0 | 45 | 232 | 0.55 | 1 | ○ | Inventive Example 5 |
|  | 4.3 | 0 | 5.5 | 0 | 47 | 235 | 0.54 | 1 | ○ | Inventive Example 6 |
| Inventive Steel 4 | <u>6.5</u> | <u>2.2</u> | <u>2.8</u> | <u>0.48</u> | 38 | 225 | <u>0.65</u> | <u>3</u> | ○ | Comparative Example 1 |
|  | 2.1 | 0 | 3.9 | 0 | 39 | 226 | 0.57 | 1 | ○ | Inventive Example 7 |
| Inventive Steel 5 | 1.2 | 0 | <u>3.2</u> | <u>0.35</u> | 43 | 256 | 0.56 | <u>5</u> | x | Comparative Example 2 |
|  | 2.2 | 0 | <u>2.9</u> | <u>0.3</u> | 48 | 253 | 0.56 | <u>3</u> | x | Comparative Example 3 |
| Inventive Steel 6 | 1.8 | <u>2.6</u> | <u>1.8</u> | <u>0.35</u> | 47 | 262 | 0.58 | <u>5</u> | x | Comparative Example 4 |
|  | <u>10.2</u> | 0 | <u>2.6</u> | <u>0.61</u> | 43 | 263 | <u>0.62</u> | <u>4</u> | ○ | Comparative Example 5 |
| Inventive Steel 7 | 1.8 | <u>0.7</u> | <u>2.5</u> | <u>0.28</u> | 45 | 286 | 0.58 | <u>4</u> | x | Comparative Example 6 |
|  | 2.1 | <u>1.1</u> | <u>2.3</u> | 0 | <u>25</u> | 289 | 0.56 | <u>3</u> | ○ | Comparative Example 7 |
| Comparative Steel 1 | <u>0</u> | 0 | <u>0</u> | 0 | <u>0</u> | 182 | <u>0.73</u> | 3 | ○ | Comparative Example 8 |
| Comparative Steel 2 | <u>13.3</u> | <u>2.5</u> | <u>0</u> | 0 | 45 | 286 | <u>0.65</u> | <u>5</u> | x | Comparative Example 9 |
|  | <u>13.1</u> | <u>3.1</u> | <u>0</u> | 0 | 38 | 293 | <u>0.66</u> | <u>5</u> | x | Comparative Example 10 |

(In this case, ① indicates a martensite area ratio (%), ② indicates a bainite area ratio (%), ③ indicates a Cgb/Cf value, and ④ 1 to 2 grades are excellent, 3 to 4 grades are normal, and 5 grade indicates inferiority, in unplated evaluation, ⑤ indicates Sealer Bending, in which ○ (OK) and x (NG) as a result of plating adhesion evaluation)

As illustrated in Tables 1 to 4, in the case of Inventive Examples 1 to 7 satisfying the alloy composition and manufacturing conditions of the present disclosure, it can be seen that a yield strength in the range of 210 to 270 MPa is provided, and the specimen is subjected to 100° C.×60 min heat treatment and then tensile test, resulting in that the yield point elongation (YP-El) does not appear at all, thereby exhibiting excellent aging resistance, excellent bake hardening and a yield ratio (YS/TS) of 0.6 or less, and exhibiting 1 to 2 grades which are the external plate level at the time of unplating determination, and providing the OK level as a result of the evaluation of plating adhesion by sealer bending.

Meanwhile, in the case of Comparative Examples 1 to 10, which do not satisfy the conditions of at least one of the alloy composition and manufacturing conditions of the present disclosure, it can be seen that at least one property of yield strength, yield ratio, bake hardening, plating adhesion and aging resistance is inferior or is insufficient.

The invention claimed is:

1. A steel sheet comprising:
in weight %, 0.005 to 0.08% of carbon (C), 1.3 to 2.3% of manganese (Mn), 0.03% or less excluding 0% of phosphorus (P), 0.01% or less excluding 0% of sulfur (S), 0.01% or less excluding 0% of nitrogen (N), 0.01 to 0.06% of aluminum (sol.Al), 1.0% or less excluding 0% of chromium (Cr), 0.1% or less excluding 0% of antimony (Sb), at least one selected from the group consisting of silicon (Si): 0.3% or less excluding 0%, molybdenum (Mo): 0.2% or less excluding 0% and boron (B): 0.003% or less excluding 0%, and a remainder of iron (Fe) and unavoidable impurities, and as a microstructure, in area %, 1 to 5% of martensite and remaining ferrite, wherein a relationship (Cgb/Cf) between an Sb average area occupancy ratio (Cgb,%) of grain boundaries of a martensite phase and a ferrite phase and an average Sb area occupancy ratio (Cf,%) in a ferrite phase within 1 μm around the martensite phase, determined by the following relationship 1, at a point of ¼t in a thickness direction of the steel sheet (where t denotes a thickness of a cold rolled steel sheet is 3.5 or more, $$Cgb/Cf \geq 3.5$$ [Relationship 1]

(where Cgb (%) indicates an Sb average area occupancy ratio of grain boundaries of a martensitic phase and a ferrite phase at a point of ¼t of a cold rolled steel sheet, and Cf (%) indicates an average Sb area occupancy ratio of a ferrite phase within 1 μm around the martensite phase).

2. The steel sheet of claim 1, wherein the steel sheet further comprises a hot-dip galvanized layer formed on a surface.

3. The steel sheet of claim 2, wherein the hot-dip galvanized layer is an alloyed hot-dip galvanized layer.

4. The steel sheet of claim 1, wherein the steel sheet has a yield strength of 210 to 270 MPa and a yield ratio (YS/TS) of 0.6 or less.

5. A method of manufacturing a steel sheet, the method comprising:
   reheating a slab including, in weight %, 0.005 to 0.08% of carbon (C), 1.3 to 2.3% of manganese (Mn), 0.03% or less excluding 0% of phosphorus (P), 0.01% or less excluding 0% of sulfur (S), 0.01% or less excluding 0% of nitrogen (N), 0.01 to 0.06% of aluminum (sol.Al), 1.0% or less excluding 0% of chromium (Cr), 0.1% or less excluding 0% of antimony (Sb), at least one selected from the group consisting of silicon (Si): 0.3% or less excluding 0%, molybdenum (Mo): 0.2% or less excluding 0% and boron (B): 0.003% or less excluding 0%, and a remainder of iron (Fe) and unavoidable impurities;
   hot rolling the reheated slab at a temperature in a range of 850 to 1150° C. to obtain a hot rolled steel sheet;
   cooling the hot rolled steel sheet to a temperature range of 550 to 750° C. at an average cooling rate of 10 to 70° C./sec;
   coiling the cooled hot rolled steel sheet at a temperature in a range of 550 to 750° C.;
   cold rolling the hot rolled steel sheet to obtain a cold rolled steel sheet;
   continuously annealing the cold rolled steel sheet under a hydrogen concentration of 3 to 30% by volume at a temperature in a range of $Ac_1+20°$ C. to $Ac_3-20°$ C.; and
   primary cooling the continuously annealed cold rolled steel sheet to 630 to 670° C. at an average cooling rate of 2 to 10° C./sec,
   wherein the cold rolling is performed using a rolling mill comprised of 5 or 6 stands, and an initial stand reduction ratio is set to 25 to 37%.

6. The method of claim 5, wherein a rolling reduction during the cold rolling is 40 to 80%.

7. The method of claim 5, further comprising:
   secondary cooling the primary cooled cold rolled steel sheet until the primary cooled cold rolled steel sheet is immersed in a hot-dip galvanizing bath maintained at 440 to 480° C. at an average cooling rate of 4 to 20° C./sec;
   immersing the secondary cooled cold rolled steel sheet in a hot-dip galvanizing bath maintained at 440 to 480° C. to obtain a hot-dip galvanized steel sheet; and
   final cooling the hot-dip galvanized steel sheet to (Ms-100)° C. or less at an average cooling rate of 3° C./sec or more.

8. The method of claim 7, further comprising obtaining an alloyed hot-dip galvanized steel sheet by an alloying heat treatment of the hot-dip galvanized steel sheet before the final cooling.

9. The method of claim 8, wherein the alloying heat treatment is performed at a temperature in a range of 500 to 540° C.

10. The method of claim 8, further comprising temper rolling the hot-dip galvanized steel sheet or the alloyed hot-dip galvanized steel sheet.

11. The method of claim 10, wherein a rolling reduction during the temper rolling is 0.3 to 1.6%.

* * * * *